US008800810B2

(12) United States Patent
Magno

(10) Patent No.: US 8,800,810 B2
(45) Date of Patent: Aug. 12, 2014

(54) CAPSULE FEEDING APPARATUS

(71) Applicant: N&W Global Vending S.p.A., Valbrembo (IT)

(72) Inventor: Alessandro Magno, Brembate Sopra (IT)

(73) Assignee: N&W Global Vending S.p.A., Valbrembo (IT)

( * ) Notice: Subject to any disclaimer, the term of this patent is extended or adjusted under 35 U.S.C. 154(b) by 16 days.

(21) Appl. No.: 13/744,009

(22) Filed: Jan. 17, 2013

(65) Prior Publication Data

US 2013/0186908 A1    Jul. 25, 2013

(30) Foreign Application Priority Data

Jan. 19, 2012 (IT) .............................. TO2012A0035

(51) Int. Cl.
*A47J 31/40* (2006.01)
*A47J 31/36* (2006.01)

(52) U.S. Cl.
USPC ........... 221/131; 221/123; 221/124; 221/133; 221/96

(58) Field of Classification Search
CPC .................................. A47J 31/36; A47J 31/40
USPC ............ 221/17, 96, 107, 108, 123, 124, 130, 221/131, 132, 133
See application file for complete search history.

(56) References Cited

U.S. PATENT DOCUMENTS

| | | | | |
|---|---|---|---|---|
| 2,552,856 A | * | 5/1951 | Knapp | ............................. 221/11 |
| 3,805,999 A | * | 4/1974 | Syverson | .................... 222/129.4 |
| 7,231,279 B2 | * | 6/2007 | Ghidotti | ........................ 700/239 |
| 7,581,658 B2 | * | 9/2009 | Mosconi et al. | .............. 221/161 |
| 8,025,180 B2 | * | 9/2011 | Magno | .......................... 221/196 |
| 2006/0124659 A1 | * | 6/2006 | Mosconi et al. | .............. 221/161 |
| 2008/0277409 A1 | * | 11/2008 | Magno | .......................... 221/119 |
| 2013/0180623 A1 | * | 7/2013 | Colnago | ....................... 141/174 |

FOREIGN PATENT DOCUMENTS

| | | |
|---|---|---|
| EP | 2306417 | 4/2011 |
| FR | 2907766 | 5/2008 |
| WO | WO 2004/045350 | 6/2004 |
| WO | WO 2005/104911 | 11/2005 |
| WO | WO 2006/097399 | 9/2006 |
| WO | WO 2009/133570 | 11/2009 |

OTHER PUBLICATIONS

Italian Search Report from Italian Application No. IT TO20120035 dated Sep. 21, 2012.

* cited by examiner

*Primary Examiner* — Patrick Mackey
(74) *Attorney, Agent, or Firm* — Dorsey & Whitney LLP

(57) ABSTRACT

A feeding apparatus of capsules to a brewing device of an automatic beverage vending machine; the feeding apparatus comprising two stores for respective types of capsules; an outlet device, common to the two stores, to feed the capsules to the brewing device; and, for each store, dispensing means of the respective capsules one by one; and orientating means configured to give the capsules a determined final orientation before they are dispensed to the brewing device; the feeding apparatus also comprising detecting means to detect whether or not a capsule is present inside the outlet device; and control means for stopping the dispensing means of both stores and preventing further capsules from being dispensed in response to a capsule-presence signal emitted by the detecting means.

12 Claims, 5 Drawing Sheets

CAPSULE FEEDING APPARATUS

TECHNICAL FIELD

Embodiments of the present invention relate to a capsule feeding apparatus, in particular disposable capsules containing powdered anhydrous material for producing beverages, for example coffee, tea, soup or similar.

Embodiments of the present invention may be advantageously applied in automatic beverage vending machines, where it is known to use a capsule feeding apparatus for supplying single capsules to a brewing device capable of preparing the relative brewed beverage starting with the contents of the capsule.

BACKGROUND

Known capsule feeding apparatuses normally comprise a store, which is adapted to contain a plurality of capsules of the same type, arranged inside the store randomly or according to a determined order; orientating means, which is adapted to receive the capsules from the store and arrange them in a preferential orientation; and a delivery device, which is adapted to receive the capsules from the orientating means and to cooperate with a brewing device inlet to deliver a single capsule to the brewing device each time.

Capsule feeding apparatuses of the known type specified above are described, for example, in EP1571951 and EP1859418 filed in the name of the same Applicant.

In the field of automatic beverage vending machines, use of capsules to produce specific beverages, in particular coffee-based beverages, is particularly appreciated both since it allows a beverage to be obtained of considerably higher quality than a beverage using loose soluble material, and for reasons of hygiene, practicality and efficiency.

Until now, however, the known automatic vending machines have normally been capable of producing one beverage type only starting with capsules, since they are generally only provided with a single capsule feeding apparatus associated with a brewing device. In order to overcome this limitation, an obvious solution could be to add other production devices, each comprising a respective capsule feeding apparatus and a respective brewing device. In practice, however, a solution of this type would be unacceptable, for reasons of space and costs.

SUMMARY

It is the object of one or more embodiments of the present invention to provide a capsule feeding apparatus that overcomes the limitation described above and that simultaneously is easy and inexpensive to manufacture.

In an embodiment of the present invention, a capsule feeding apparatus for feeding capsules to a brewing device of an automatic beverage vending machine is disclosed. The capsule feeding apparatus includes two stores each of which is designed to store a respective type of capsule; and an outlet device, common to both of the stores, for feeding the capsules to the brewing device. For each store, respective dispensing means to dispense a succession of the respective capsules one by one; and respective orientating means designed to cooperate with the respective capsules so as to cause the capsules to be dispensed by the outlet device to the brewing device with a determined final orientation are provided. The capsule feeding apparatus further includes first detecting means to detect whether or not a capsule is present within the outlet device, and control means to stop the dispensing means of both stores and prevent further capsules from being dispensed in response to a capsule-presence signal emitted by the first detecting means.

BRIEF DESCRIPTION OF THE DRAWINGS

A non-limiting embodiment of the invention will be described by way of example with reference to the accompanying drawings, in which:

FIGS. 6 to 8 show a detail in FIG. 4 in respective different operating configurations.

DETAILED DESCRIPTION

Figure 1:
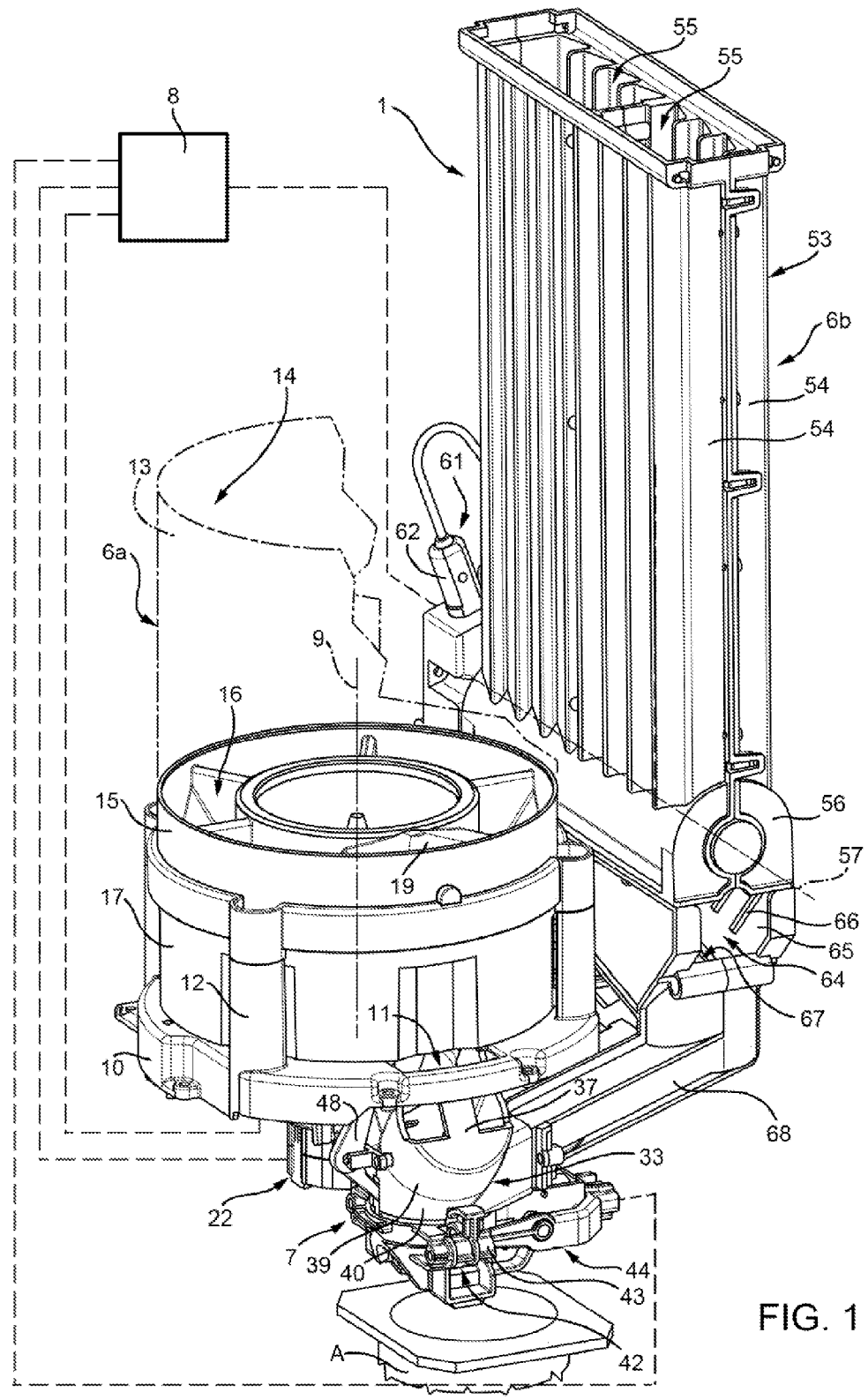
FIG. 1 is a perspective view, with parts removed for clarity, of a preferred embodiment of the capsule feeding apparatus of the present invention.

In FIG. 1, the number 1 indicates, as a whole, a capsule feeding apparatus 2 for feeding disposable capsules containing powdered anhydrous material, such as coffee, tea, etc., for the preparation of beverages.

In a condition of normal use, the feeding apparatus 1 is housed inside an automatic hot beverage vending machine (not shown) to cooperate with a brewing device A (of known type) designed to receive, each time, from the feeding apparatus 1, a single capsule 2, orientated in the manner which will be described below, and to supply a flow of hot water through the capsule 2 in order to extract the relative beverage from it, by brewing the material it contains.

As will be described in detail below, the feeding apparatus 1 of capsules 2 is configured to contain and to deliver to the brewing device A two types of capsules 2, indicated, hereunder, with 2*a* and 2*b*, which are substantially identical to each other as far as concerns the shape and external dimensions, but differ in terms of the material they contain, thus making it possible to prepare the respective different beverages.

In the example shown, each capsule 2*a*, 2*b* comprises an external, cup-shaped cover, which has a longitudinal axis 3 and is defined by a bottom surface and by a side surface provided with an external annular flange 4 around its free edge, to which a closing surface 5 of the capsules 2*a*, 2*b* is firmly attached. The side surface is preferably truncated cone shaped and tapered towards the bottom surface and the closure surface 5 is a film sealing the capsule 2*a*, 2*b*.

Figure 2:
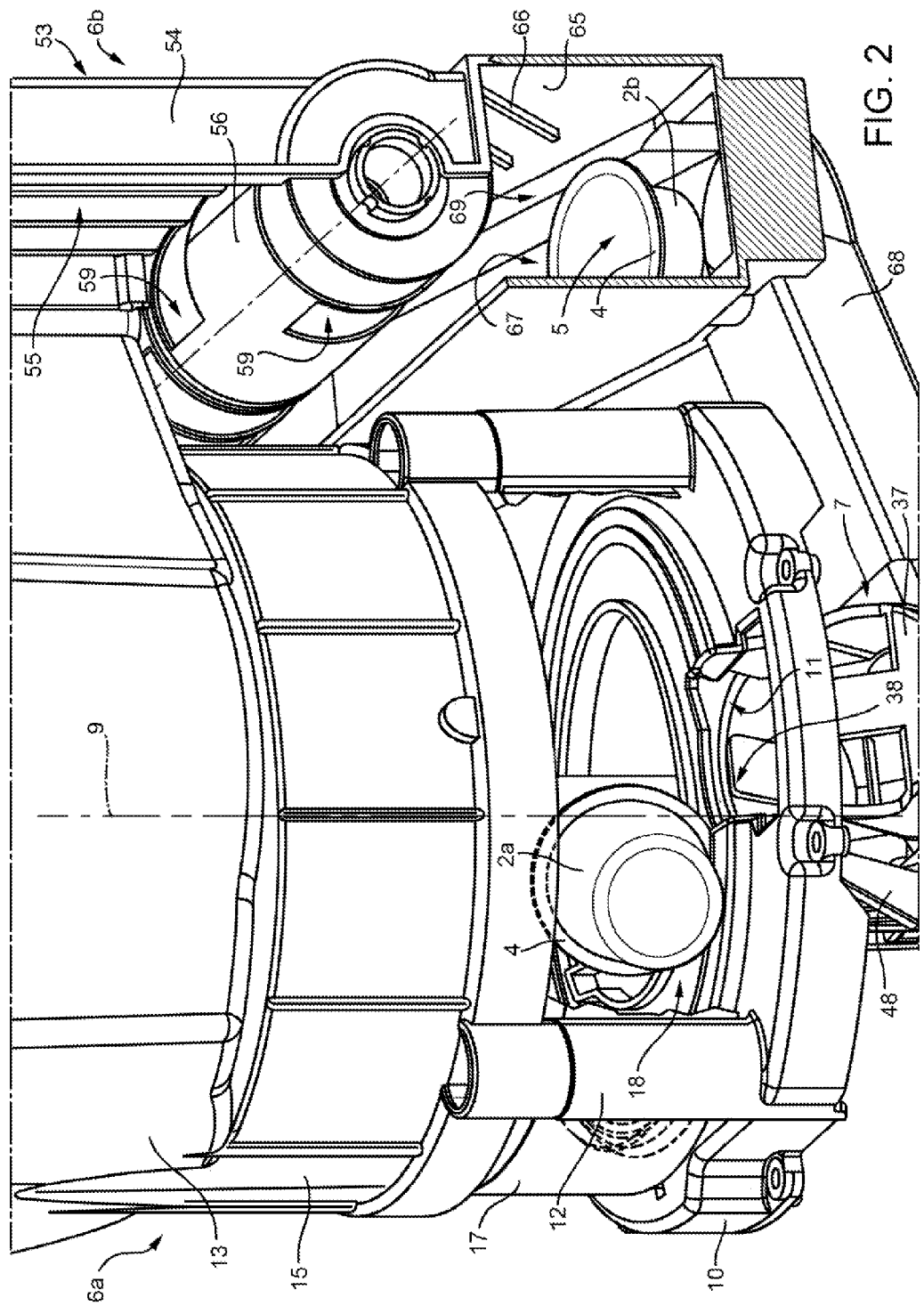
FIG. 2 is a perspective view, on an larger-scale and with parts removed for clarity, of a detail in FIG. 1.

As shown in FIGS. 1 and 2, the feeding apparatus 1 comprises two stores 6*a* and 6*b*, which are designed to contain a plurality of capsules 2*a* and, respectively, 2*b*, and an outlet device 7, which is configured to receive, in use, a capsule 2*a* from store 6*a* or a capsule 2*b* from store 6*b* and to deliver it to an inlet of the aforementioned brewing device A.

The feeding apparatus 1 also comprises electronic control means 8, configured to manage, in the manner which will be described below, stores 6*a* and 6*b* and outlet device 7 so that, in use, stores 6*a*, 6*b* are activated selectively as a function of the beverage type selected and for the time necessary to deliver a single capsule 2*a* or 2*b* to outlet device 7.

Figure 4:
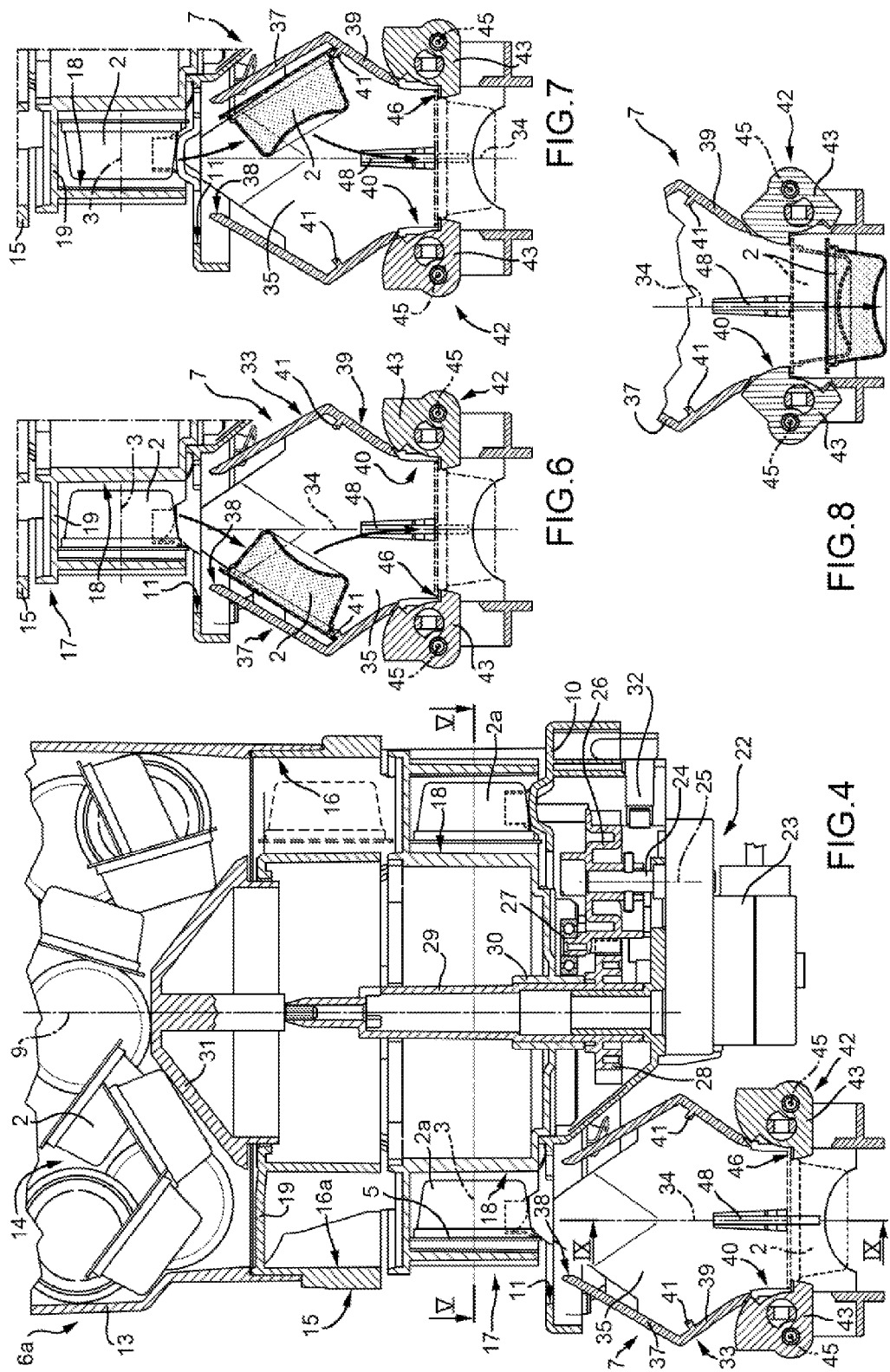
FIG. 4 illustrates an axial cross-section of part of the apparatus of FIG. 1.

With reference to FIGS. 1, 2 and 4, store 6*a* has a generally cylindrical shape, develops around substantially vertical axis 9 and comprises an upper storage portion of the capsules 2*a* and a lower supporting plate 10, which is attached to a frame (not shown) of the automatic vending machine (not shown), is coaxial to axis 9 and has, along one peripheral portion, a pass-through hole 11 parallel to axis 9 and defining an outlet of the capsules 2a from store 6a.

Said upper storage portion is supported by plate 10 by means of a plurality of columns 12 parallel to axis 9 and distributed along a peripheral edge of plate 10 itself, and comprises a preferably cylindrical container 13 coaxial to axis 9 and defining, inside it, a chamber 14, an upper portion of which is adapted to contain a plurality of capsules 2a positioned completely randomly. At its lower end, chamber 14 is occupied by orientating means 15, which perform the function of orientating the capsules 2a coming from the upper portion of chamber 14 in a manner that the respective longitudinal axes 3 are in a radial position with respect to the axis 9.

In greater detail and with reference to FIG. 4, the orientating means 15 comprise an annular body coaxial to axis 9 and equipped internally with a plurality of radial baffles, which are uniformly distributed around axis 9 to define a plurality of cavities 16 open at their respective axial ends and communicating above with the upper portion of storage chamber 14. The amplitude and shape of each cavity 16 is such as to allow, in use, a capsule 2a to enter and cross it transversally solely when oriented with its longitudinal axis 3 positioned radially and with the respective closing surface 5 facing or opposite axis 9.

Store 6a is also equipped with a release device, comprised between plate 10 and orientating means 15 and comprises a carousel 17 shaped to receive, in use, the capsules 2a from orientating means 15 and to dispense them, one by one, to the inlet of brewing device A through outlet hole 11.

Figure 5:
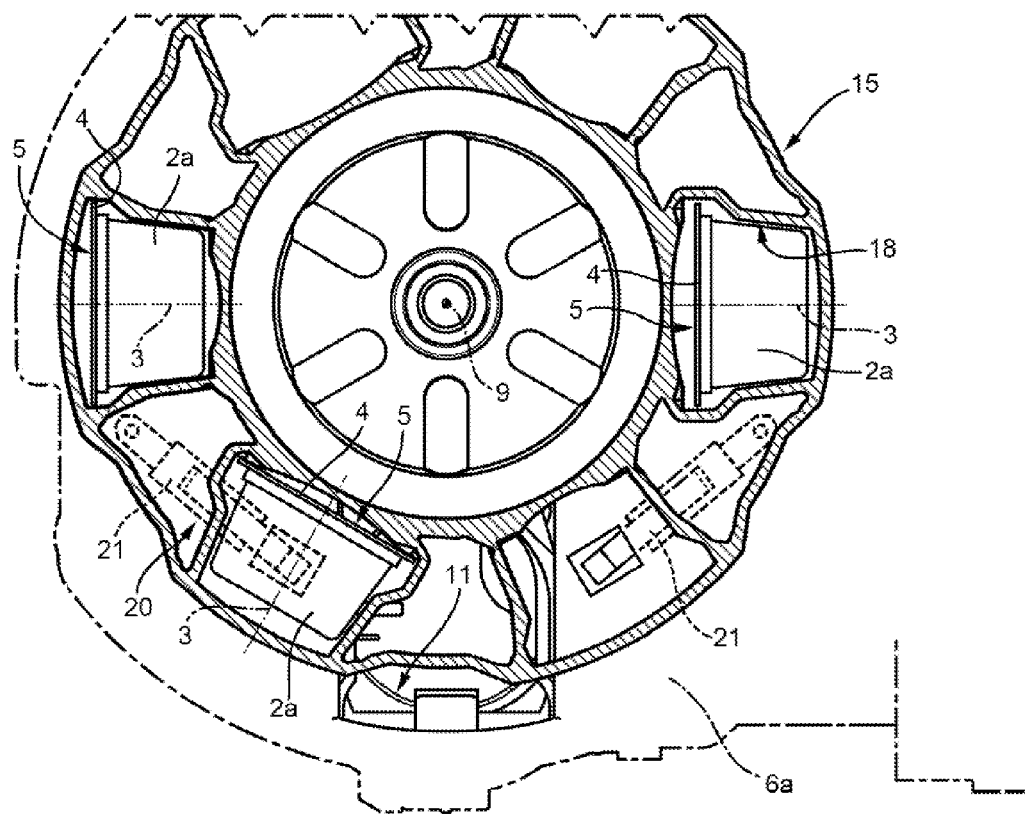
FIG. 5 is a cross-section, according to line V-V in FIG. 4.

For this purpose and according to what is illustrated in FIGS. 4 and 5, carousel 17 comprises an annular body, which is coaxial to axis 9, is equipped with a plurality of pass-through axial cavities 18 distributed uniformly around axis 9, and is mounted rotating around axis 9, to rotate with respect to plate 10 and selectively bring the cavities 18 into a position facing the outlet hole 11.

The shape and dimensions of cavities 18 are identical to those of cavities 16 with the result that, when in use, a cavity 18 is aligned axially to a cavity 16 containing a capsule 2a, said capsule leaving cavity 16 and entering cavity 18, maintaining precisely the previous orientation acquired in the relative cavity 16, i.e. with the respective longitudinal axis 3 positioned radially with respect to axis 9 and with the respective closing surface 5 facing or opposite axis 9.

Preferably, but not necessarily, the number of cavities 16 of the orientating means 15 is equal to the number of cavities 18 of carousel 17; in the embodiment shown, there are six cavities 16 and also six cavities 18 and they are uniformly distributed around axis 9 with a 60° pitch.

In order to ensure uniform filling of the carousel 17 whatever the orientation of the capsules 2a in the respective cavities 16, the cavities 18 are shaped (FIG. 5) in a manner to house, alternating around axis 9, capsules 2a arranged with closing surface 5 facing axis 9 and capsules 2a arranged with closing surface 5 opposite axis 9.

According to what is illustrated in FIGS. 1 and 4, cavity 16 aligned with outlet hole 11, and indicated, in the appended figures, with reference number 16a, is closed at the top by a partition 19, which prevents the capsules 2a arranged in the upper portion of chamber 14 from entering cavity 16a and therefore reaching, in a totally uncontrolled manner, outlet hole 11, passing through the cavity 18 which is aligned each time with cavity 16a.

Also associated with carousel 17 are presence detecting means (20) (FIG. 5), which are connected to the electronic control means 8 and serve to detect the presence of the capsules 2a near the outlet hole 11. In particular, detecting means 20 comprise two micro-switches 21 (illustrated in FIG. 5 with a broken line), which are mounted on plate 10 on the opposite part with respect to carousel 17, are arranged close to and as opposing bands of outlet hole 11, and are provided with respective active elements, each of which extends across plate 10 in a manner to be engaged by the capsule 2a which is positioned at outlet hole 11 each time.

Carousel 17 is rotated by means of an actuator device 22 comprising (FIG. 4) an electric motor 23, controlled by the electronic control means 8, and a transmission which is adapted to convert the continuous motion of the motor 23 into an intermittent motion of the carousel 17. For this purpose, motor 23 is arranged, in a fixed position, beneath plate 10 and is provided with an outlet shaft 24 rotating around an axis 25 parallel to axis 9, and the transmission comprises a gear 26, which is keyed onto the shaft 24 and carries attached, on the part facing plate 10, a bearing 27, which defines the actuator unit of a Maltese Cross-shaped shaped mechanism (of known type) comprising, besides bearing 27, a cross-shaped guide (not shown) on a lower surface of carousel 17 and engaged by bearing 27 to convert, in use, the continuous rotary motion of bearing 27 around axis 25 into an intermittent rotary motion of the carousel 17 around axis 9. In this case, since there are six of cavities 18, the cross-shaped guide (not shown) will be configured in a manner to give 60° advance step to carousel 17.

Gear 26 also engages with a gear 28, which is coaxial to axis 9 and has a tubular hub, the lower portion of which is fitted rotating onto a tubular end-piece of plate 10, and the upper portion 29 of which engages, in a rotating manner, a ferrule 30 forming one piece with the lower surface of carousel 17. The upper portion 29 extends across the carousel 17 and the orientating means 15 and supports, at its free end, a distribution cone 31 with the function of moving the capsules 2a arranged inside chamber 14 in a manner to assist entry of capsules 2a into cavities 16, breaking any bridges which may be created upstream of the orientating means 15.

A micro-switch 32 is also associated with the actuator device 22, which is electrically connected to control means 8 and cooperates with a peripheral portion of gear 26 to signal to control means 8, when this commands activation of motor 23, rotation of gear 26 around axis 25 and, in this manner, to allow control means 8 to control correct functioning of the carousel 17 and promptly to identify any blocking or malfunction.

According to what is illustrated in FIG. 4 and FIGS. 6 to 9, outlet device 7 is arranged laterally to plate 10 immediately beneath outlet hole 11 and comprises a hollow body 33 with an axis 34 parallel to axis 9, comprised between two flat side surfaces 35 and 36 parallel to each other and to axis 34 and comprising an inlet funnel 37 tapering downwards and presenting an upper inlet opening 38 facing outlet hole 11, and an outlet funnel 39 tapering upwards and provided with a lower outlet duct 40 coaxial to axis 34. The outlet funnel 39 is provided at its opening with two internal ribs 41 arranged as opposing bands of axis 34 and transversal to both axis 34 and to side surfaces 35 and 36.

The inlet of lower outlet duct 40 is controlled by a release device 42 comprising two blocks 43 arranged between surfaces 35 and 36 and oscillating, under the thrust of an actuator device 44, around respective axes 45 perpendicular to surfaces 35 and 36 between a blocking position (FIGS. 4, 6 and 7), in which the blocks 43 define support housing 46 for flange 4 of a capsule 2, and a release position (FIG. 8), in which the blocks 43 allow free passage of the capsule 2 from outlet funnel 39 to lower outlet duct 40.

Figure 9:
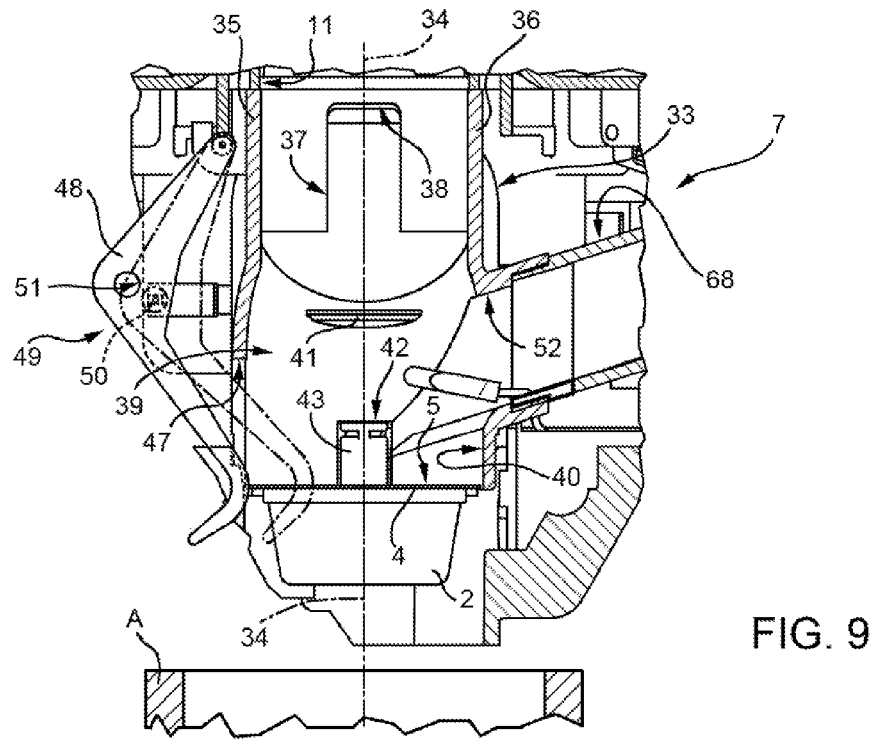
FIG. 9 is a cross-section, according to line IX-IX in FIG. 4.

According to what is illustrated in FIG. 9, through side surface 35, at the inlet of lower outlet duct 40, there is a slit 47 parallel to axis 34 and engaged by a free end portion of a lever 48 of detecting means 49 detecting the presence of a capsule 2 inside the outlet funnel 39. The lever 48 is mounted to rotate, under the thrust of a capsule 2 resting on housing 46, between a stable equilibrium position (no capsule 2 present in housing 46), in which the end part of the lever 48 penetrates inside outlet funnel 39 (this position of lever 48 is illustrated in FIG. 9 with a broken line), and an instable equilibrium position (capsule 2 present in housing 46), in which the end part of lever 48 is positioned outside outlet funnel 39 (this position of lever 48 is illustrated in FIG. 9 with a continuous line).

The detecting means 49 also comprises a photocell 50, which is aligned with a pass-through hole 51 through an intermediate portion of lever 48 when lever 48 is in its stable equilibrium position. In this manner, when lever 48 is pushed outwards in its instable equilibrium position by a capsule 2, the light beam of photocell 50 is interrupted and electronic control means 8, which is connected to the photocell 50, is able to detect the presence of capsule 2 in lower outlet duct 40 and consequently to control activation of the actuator device 44 and dispense capsule 2 from the release device 7.

At the inlet of lower outlet duct 40, through side surface 36, there is an inlet opening 52 for the capsules 2b coming from store 6b.

Figure 3:
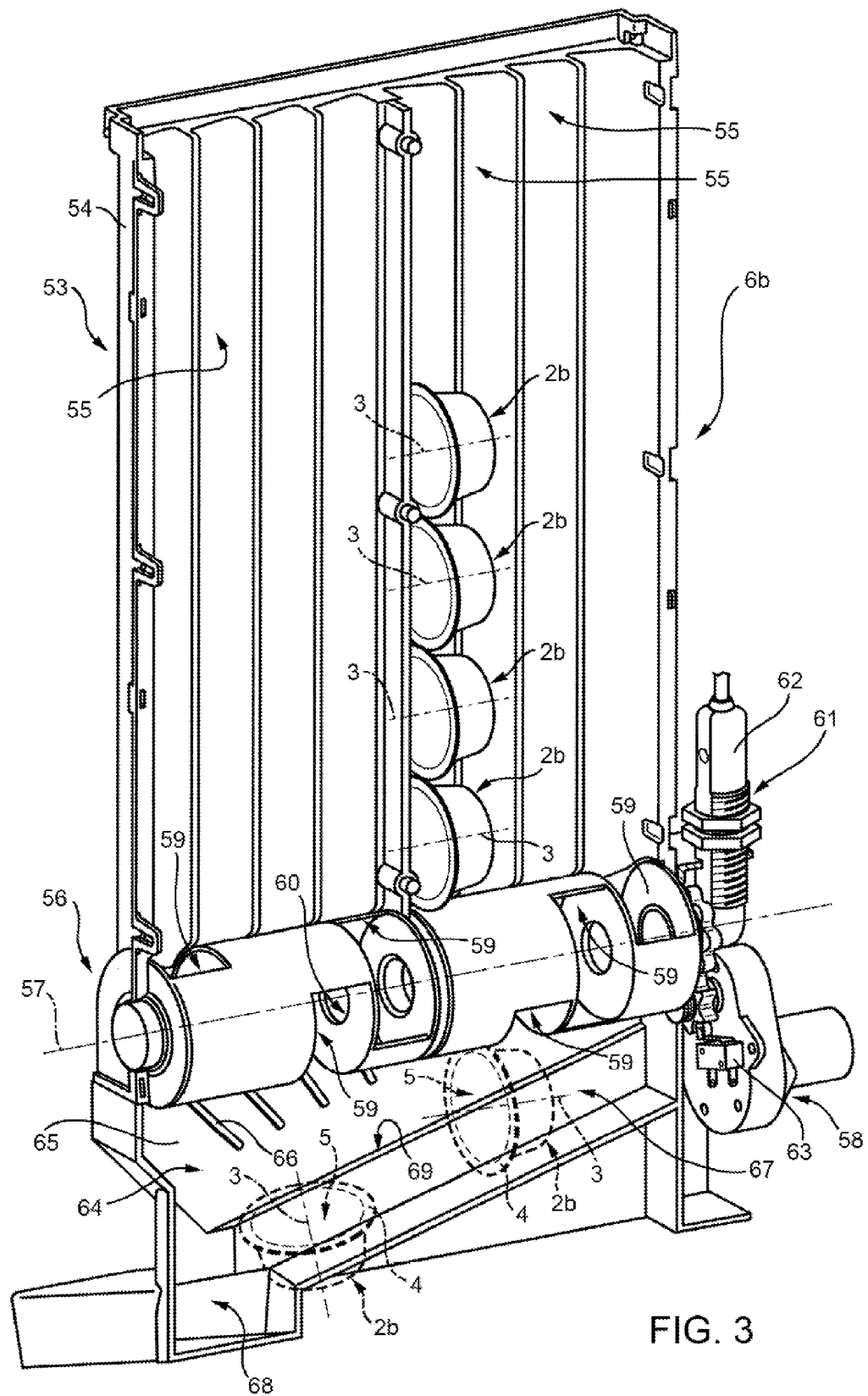
FIG. 3 is a perspective view, with parts removed for clarity, of a further detail in FIG. 1.

According to what is illustrated in FIGS. 1 and 3, store 6b comprises an upper portion defined by a container 53 with a substantially rectangular shape in cross-section and comprising tow semi-shells 54 facing each other and connected, which are provided with respective internal tabs defining a plurality of vertical channels 55, in this case eight channels 55 parallel to axis 9, each of which is adapted to accommodate a stack of capsules 2b arranged transversally, or with the respective axes 3 extending horizontally, and has an upper inlet opening and a lower outlet opening.

The store 6b also comprises a release device comprising a drum 56 with an axis 57 extending transversally to the channels 55 and arranged under container 53 facing the outlet openings of the channels 55. The drum 56 is mounted for step-rotation around its own axis 57 under the thrust of an actuator device 58 controlled by the electronic control means 8 and is provided with a plurality of radial housings 59, which are equal in number to the channels 55, are arranged at the outlet openings of the respective channels 55, are configured to receive respective capsules 2b arranged vertically and are distributed along the drum 56 according to a cylindrical constant-pitch helix. In the embodiment shown, there are eight radial housings 59 staggered angularly, each by 45° with respect to each adjacent radial housing 59 in a manner that, at each 45° advance step of the drum 56 starting from an initial position, a single radial housing 59 is oriented upwards in a position to receive the respective capsule 2b from the respective channel 55 and, simultaneously, a single radial housing 59 is oriented downwards in a position to deliver the respective capsule 2b.

The drum 56 has a central axial hole 60 extending along the entire length of the drum 56 and associated with detecting means 61 connected to the electronic control means 8 and comprising a photocell 62 which is adapted to emit a beam along the hole 60 to detect the presence or not of at least one capsule 2b inside the radial housings 59.

Correct step-rotation of the drum 56 is controlled by a micro-switch 63 associated with the actuator device 58 and connected to the electronic control means 8.

According to what is better illustrated in FIGS. 2, 3, store 6b also comprises, under the drum 56, a receiving chamber 64, which is bordered laterally by two surfaces 65 parallel to each other and to the axis 57 and is closed beneath by an inclined channel 67, with a depth equal to or higher than the height of the capsules 2b and with a lower outlet end coupled to the inlet end of a further channel 68 arranged outside the receiving chamber 64 and having a lower outlet end connected to inlet opening 52 of hollow body 33.

The sides 65 are arranged at a distance one from the other approximating in excess the diameter of the flange 4 of capsules 2b and are provided with a plurality of ribs 66, which are perpendicular to the channel 67 and define sliding channels of the capsules 2b towards said channel 67.

The width of channel 67 is higher than the maximum diameter of the body of the capsules 2b, but lower than the distance between the sides 65, to which the channel 67 is coupled by means of two surfaces 69, facing the drum 56 and inclined downwards and towards the channel 68 in a manner to define a tipping and sliding surface of the capsules 2b. In fact, when a capsule 2b leaves the respective radial housing 59, the ribs 66 ensure the capsule 2b slides towards the channel 67 arranged with the respective axis 3 substantially parallel to said channel 67, in a manner that the capsule 2b falls transversally towards the channel 67 and, after flange 4 strikes the surfaces 69, tips backwards due to its own weight, partially enters the channel 67 and, remaining suspended with the flange 4 resting on surfaces 69, slides along said channel 67.

In other words, the ribs 66, the surfaces 69 and, in general, the channel 67 define, as a whole, orientating means which ensure that the capsules 2b leaving the drum 56 are arranged with the respective closing surface 5 turned upwards and arrive at opening 52 with this same orientation and, therefore, at the inlet of the lower outlet duct 40 of the release device 7.

Functioning of the feeding apparatus 1 will be described below starting from an idle condition, in which the carousel 17 is still, two cavities 18 are arranged as opposing bands of the outlet hole 11 at the micro-switches 21, and one of these two cavities 18 contains a capsule 2a, which therefore engages the active element of the respective micro-switch 21. Similarly, the drum 56 is still, a radial housing 59 is empty and arranged in its delivery position, and several of the remaining radial housings 59 contain respective capsules 2b. In the idle condition, lastly, the outlet device 7 is empty and lever 48 is arranged in its stable equilibrium position.

The case of a user selecting a beverage obtainable by means of a capsule 2a on an automatic vending machine will now be examined.

Once the beverage is chosen, the control means 8 commands activation of the motor 23 in a manner to bring the carousel 17 in step-rotation around the axis 9. The direction of rotation of the carousel 17 is determined by the control means 8 on the basis of the presence signal detected by the micro-switches 21 in a manner that said one of said two cavities 18 containing the capsule 2a is advanced towards the outlet hole 11. When said cavity 18 is aligned with the outlet hole 11, the capsule 2a falls from the cavity 18 due to gravity and enters the inlet funnel 37 through the outlet hole 11 and the opening 38. If, after the first advance step of the carousel 17, the cavity 18 which reaches the position previously occupied by the discharged cavity 18 contains a capsule 2a, the corresponding micro-switch 21 sends a presence signal to the electronic control means 8 and the motor 23 is immediately stopped.

Otherwise, the carousel 17 is made to rotate through subsequent advance steps until the micro-switch 21 does not detect the presence of a capsule 2a in that position.

According to what is illustrated in FIGS. 6 and 7, the shape of the inlet funnel 37 is such as to alter the freefall trajectory of the capsule 2a through the opening 38, in a manner to cause the relative flange 4 to engage with one or other of the ribs 41, cause the capsule 2a to tip and deliver it to the lower outlet duct 40 arranged with its vertical axis 3 and with closing surface 5 turned upwards. In this regard, it should be noted that the orientation operation of the capsules 2a from a random arrangement in the chamber 14 to the final arrangement at the inlet of the lower outlet duct 40 occurs in two separate steps through the action of the orientating means 15 first and, subsequently, the inlet funnel 37 and the ribs 41.

When the capsule 2a is arranged resting on the housing 46, the lever 48 is pushed into its instable equilibrium position and the photocell 50 signals the presence of a capsule 2a to the electronic means 8, which commands activation of the actuator device 44, with consequent release of the capsule 2a (FIG. 8).

The case of a user selecting a beverage obtainable by means of a capsule 2b on an automatic vending machine will now be examined.

Once the beverage is chosen, the control means 8 commands activation of the actuator device 58, which step-rotates, with 45° angular advances, the drum 56 until a radial housing 59 containing a capsule 2b reaches the delivery position and allows the respective capsule 2b to fall through gravity into the receiving chamber 64, and said capsule, through channel 67, channel 68 and opening 52, reaches the outlet funnel 39 and the lower outlet duct 40 and rests on housing 46, pushing the lever 48 into its instable equilibrium position. The photocell 62 signals the presence of the capsule 2b in the outlet device 7 to the electronic control means 8, which immediately stops the actuator device 58 and, therefore, the drum 56, thereby preventing other capsules 2b from leaving the drum 56. Simultaneously, the electronic control means 8 control activation of the actuator device 44, with consequent release of the capsule 2b (FIG. 8).

The invention claimed is:

1. A capsule feeding apparatus for feeding capsules to a brewing device of an automatic beverage vending machine, the capsule feeding apparatus comprising:
   two stores each of which is designed to store a respective type of capsule;
   an outlet device, common to both of the stores, for feeding the capsules to the brewing device;
   for each store:
     respective dispensing means for dispensing a succession of the respective capsules one by one; and
     respective orientating means designed to cooperate with the respective capsules so as to cause the capsules to be dispensed by the outlet device to the brewing device with a determined final orientation;
   first detecting means for detecting whether or not a capsule is present within the outlet device; and
   control means for stopping the dispensing means of both stores and prevent further capsules from being dispensed in response to a capsule-presence signal emitted by the first detecting means.

2. The capsule feeding apparatus claimed in claim 1, wherein the outlet device includes an inlet portion and an outlet portion, which is provided, at a lower end, with an outlet duct; the outlet device including a release device, which is arranged across the outlet duct, is designed to be engaged by a single capsule arranged in the determined final orientation, and is connected to the control means for allowing the capsule to be dispensed in response to a capsule-presence signal emitted by the first detecting means.

3. The capsule feeding apparatus claimed in claim 2, wherein a first of the two stores includes an upper storage portion for a plurality of randomly arranged capsules, and has a capsule delivery lower opening facing the inlet portion of the outlet device; the orientating means including first orientating means, which are associated to the first store and include a first orientating device arranged downstream from the upper storage portion and upstream from the delivery outlet and configured to arrange the capsules according to a determined intermediate orientation.

4. The capsule feeding apparatus claimed in claim 3, wherein the first orientating means associated to the first store further comprise a second orientating device, which is carried by the outlet device, is arranged upstream from the outlet duct and is configured to change the orientation of the capsules from the intermediate orientation to the final orientation.

5. The capsule feeding apparatus claimed in claim 3, wherein the dispensing means include first dispensing means associated to the first store and comprising, in turn, a mobile body, which is arranged between the first orientating means and the delivery opening and is configured to convey the capsules, one by one, from the first orientating means to the delivery opening.

6. The capsule feeding apparatus claimed in claim 5, wherein the first store includes a container, which has a first substantially vertical axis and defines the upper storage portion; the first orientating device being provided with first axial cavities, each of which is configured to accommodate a capsule arranged according to the intermediate orientation; the mobile body being defined by a carousel coaxial to the first axis and provided with axial second cavities, which are movable under the first axial cavities to receive from the first axial cavities respective capsules arranged according to the intermediate orientation and to convey the capsules thus oriented to the delivery opening.

7. The capsule feeding apparatus claimed in claim 6, wherein each capsule, when arranged according to the intermediate orientation, is arranged with its longitudinal axis in a radial position with respect to the first axis.

8. The capsule feeding apparatus claimed in claim 3, wherein the first store includes second detecting means for detecting the presence of at least one capsule inside the first dispensing means and at the delivery opening.

9. The capsule feeding apparatus claimed in claim 2, wherein the first detecting means include a photocell and a lever mounted on the outlet device to move between a stable equilibrium position, occupied when the outlet duct is empty, in which the lever does not interrupt the light beam of the photocell, and an instable equilibrium position, occupied when the outlet duct accommodates a capsule, in which the lever interrupts the light beam of the photocell.

10. The capsule feeding apparatus claimed in claim 2, wherein a second of the two stores includes a container provided with a plurality of substantially vertical channels, each of which is adapted to accommodate a stack of capsules arranged with their longitudinal axes extending substantially horizontally; and wherein the dispensing means include second dispensing means associated with the second store and comprising, in turn, a drum, which has an axis extending generally transversally to the channels, is arranged under the container facing the outlet openings of the channels, and is provided with a plurality of radial housings, which are equal in number to the channels, are arranged at the outlet openings of the channels, are configured to receive respective capsules arranged transversally, and are distributed along the drum according to a cylindrical constant-pitch helix; the drum being mounted for step-rotation around its axis and selectively to bring the radial housings into a position facing downwards to allow the respective capsules to fall into a receiving chamber.

11. The capsule feeding apparatus claimed in claim 10, wherein the second store includes sliding conveying means extending from the receiving chamber to the outlet device and having an outlet lower end at the inlet of the outlet duct.

12. The capsule feeding apparatus claimed in claim 10, wherein the orientating means include second orientating means, which are associated to the second store and are arranged inside the receiving chamber to arrange the capsules according to the final orientation.

* * * * *